United States Patent [19]

Haddad, Jr.

[11] Patent Number: 5,275,459

[45] Date of Patent: Jan. 4, 1994

[54] ELECTRICALLY INSULATED TRUCK COVER ARM

[75] Inventor: Edward N. Haddad, Jr., Worcester, Mass.

[73] Assignee: Pioneer Consolidated Corporation, N. Oxford, Mass.

[21] Appl. No.: 931,031

[22] Filed: Aug. 14, 1992

[51] Int. Cl.$^5$ ............................................. B60P 7/04
[52] U.S. Cl. ...................................... 296/100; 296/98; 174/5. R; 174/138. D
[58] Field of Search ................... 296/98, 100; 81/53.1; 174/5

[56] References Cited

U.S. PATENT DOCUMENTS

| | | | |
|---|---|---|---|
| 403,482 | 5/1889 | O'Beirne | 174/138 D |
| 449,777 | 4/1891 | Hall | 174/138 DX |
| 777,215 | 12/1904 | Meston | 174/138 D |
| 1,655,892 | 1/1928 | Colburn | 174/138 D |
| 1,864,351 | 6/1932 | Hendee | 174/138 D |
| 2,408,253 | 9/1946 | Diebold | 174/5 R |
| 2,438,504 | 3/1948 | Hubbard | 174/5 R |
| 2,911,246 | 11/1959 | Caruso | 174/138 D |
| 2,997,529 | 8/1961 | Fink | 174/138 D |
| 3,243,504 | 3/1966 | Johnson | 174/5 R |
| 3,342,041 | 9/1967 | Nebiker, Jr. | 174/138 D |
| 3,549,197 | 12/1970 | Sibley | 296/100 |
| 3,549,198 | 12/1970 | Cappello | 296/100 |
| 3,549,199 | 12/1970 | Sibley | 296/100 |
| 3,628,826 | 12/1971 | Sibley | 296/98 |
| 3,833,255 | 9/1974 | Logue | 296/101 |
| 3,868,142 | 2/1975 | Bachand et al. | 296/98 |
| 3,975,047 | 8/1976 | McClellan | 296/100 |
| 4,023,857 | 5/1977 | Killion | 296/98 |
| 4,027,911 | 6/1977 | Johnson | 52/66 X |
| 4,030,780 | 6/1977 | Petretti | 296/100 |
| 4,050,734 | 9/1977 | Richard | 296/98 |
| 4,095,840 | 6/1978 | Woodard | 296/100 |
| 4,157,202 | 6/1979 | Bachand | 296/100 |
| 4,341,416 | 7/1982 | Richard | 296/98 |
| 4,516,802 | 5/1985 | Compton | 296/98 |
| 4,740,029 | 4/1988 | Tuerk | 296/100 |
| 4,874,196 | 10/1989 | Goldstein et al. | 296/98 |
| 4,981,317 | 1/1991 | Acosta | 296/98 |

FOREIGN PATENT DOCUMENTS 34336 11/1970 Japan ............................ 174/138 D

*Primary Examiner*—Dennis H. Pedder
*Attorney, Agent, or Firm*—Weingarten, Schurgin, Gagnebin & Hayes

[57] ABSTRACT

An electrically insulated truck cover manipulator assembly which includes two arms, a drive mechanism, and a tie-rod. The tie-rod is attached both to a flexible cover which moves longitudinally along the length of a truck body or trailer and to the two arms. In one embodiment, the arms each include an upper support member and a lower support member joined by an electrically insulating connector. Both the upper and lower support members may be filled with dielectric foam. The drive mechanism moves the arms about a pivot causing the tie-rod joining the upper ends of the upper support members to pull the flexible cover over the length of the truck trailer or body and its contents. In the event either of the upper support members or the tie-rod makes contact with overhead power lines during operation, the insulating connectors prevent electricity from flowing from the upper support members to the lower support members and thus to the truck frame. In addition, the multipiece construction of each arm allows either the upper support member or the tie-rod to be easily replaced if damaged.

2 Claims, 2 Drawing Sheets

ELECTRICALLY INSULATED TRUCK COVER ARM

FIELD OF THE INVENTION

This invention relates to truck covers and more particularly to an assembly used to manipulate the truck covers between open and closed positions.

BACKGROUND OF THE INVENTION

Flexible covers for truck bodies or trailers serve both to protect a load within the trailer or body and to minimize the likelihood of all or part of the load escaping. Because covers for truck bodies or trailers are often large and unwieldy, some form of mechanical assistance is useful to spread and secure the cover over the body or trailer. Truck cover manipulators provide this assistance.

A truck cover manipulator assembly, such as shown in U.S. Pat. No. 3,549,198 to Cappello, generally uses two metal arms powered by a drive mechanism to draw the flexible cover over the trailer or body from one end to the other. As the arms move longitudinally, the arm ends securing one end of the cover move in an arcuate path. When the arms are in a vertical position, they raise the effective height of the truck considerably. Even when an operator is aware that the arms will extend upward, their exact height and amount of obstacle clearance are difficult to estimate visually. This situation is particularly hazardous when a truck cover manipulator assembly is operated near overhead power lines, because the arms of the truck cover manipulator assembly have the potential to contact the power lines and electrocute the operator or damage the truck.

In addition to the risk of electrocution, as the arms swing up and over the trailer or body, the upper portion of the arms are susceptible to bending from the load upon them or from striking an object. The resulting damage to the arms or tie-rod requires expensive and time consuming repair. Thus, the present invention remedies the problems associated with prior truck cover manipulator assemblies by providing both electrical insulation to protect the operator and truck, and segmented arms which permit only the damaged portion of the arm to be replaced.

SUMMARY OF THE INVENTION

The present invention provides for a truck cover manipulator assembly in which each arm includes an upper and lower support member joined by an electrically insulated connector section. In one embodiment, the assembly comprises two arms, each having a metal lower support member pivotally attached to a trailer frame and a metal upper support member, a tie-rod to join the upper support members, a drive mechanism to move the support members longitudinally along the length of the trailer or body, and an insulating connector to join the lower end of each upper support member to the upper end of the respective lower support member. Each of the upper and lower support members may be filled with dielectric foam to prevent moisture from condensing on the inside of the support members. The insulating connector joins the upper support member of each arm to the lower support member of the same arm, and insulates the support members from each other. At the joint, the upper support member and the lower support member are separated by a gap sufficient to prevent any electricity from arcing from the upper support member to the lower support member. Several skirts are attached to the upper support member at various points to shed water away from the outside of the arm and to increase electrical path length. The upper and lower support members are preferentially designed in a rectangular shape, however other shapes, such as cylindrical or square, may also be used.

Because the upper support members are not in electrically conductive contact with the lower support members, electricity will not flow from the upper support members to the lower support members in the event one or both of the upper support members or the tie-rod contacts overhead power lines. In addition, the multi-piece structure of the insulating arms facilitates replacement of the upper portion of the arms that are most susceptible to bending when struck or overstressed.

DESCRIPTION OF THE DRAWINGS

The invention will be more fully understood from the following detailed description, taken in conjunction with the accompanying drawings in which.

DETAILED DESCRIPTION OF THE INVENTION

Figure 1:
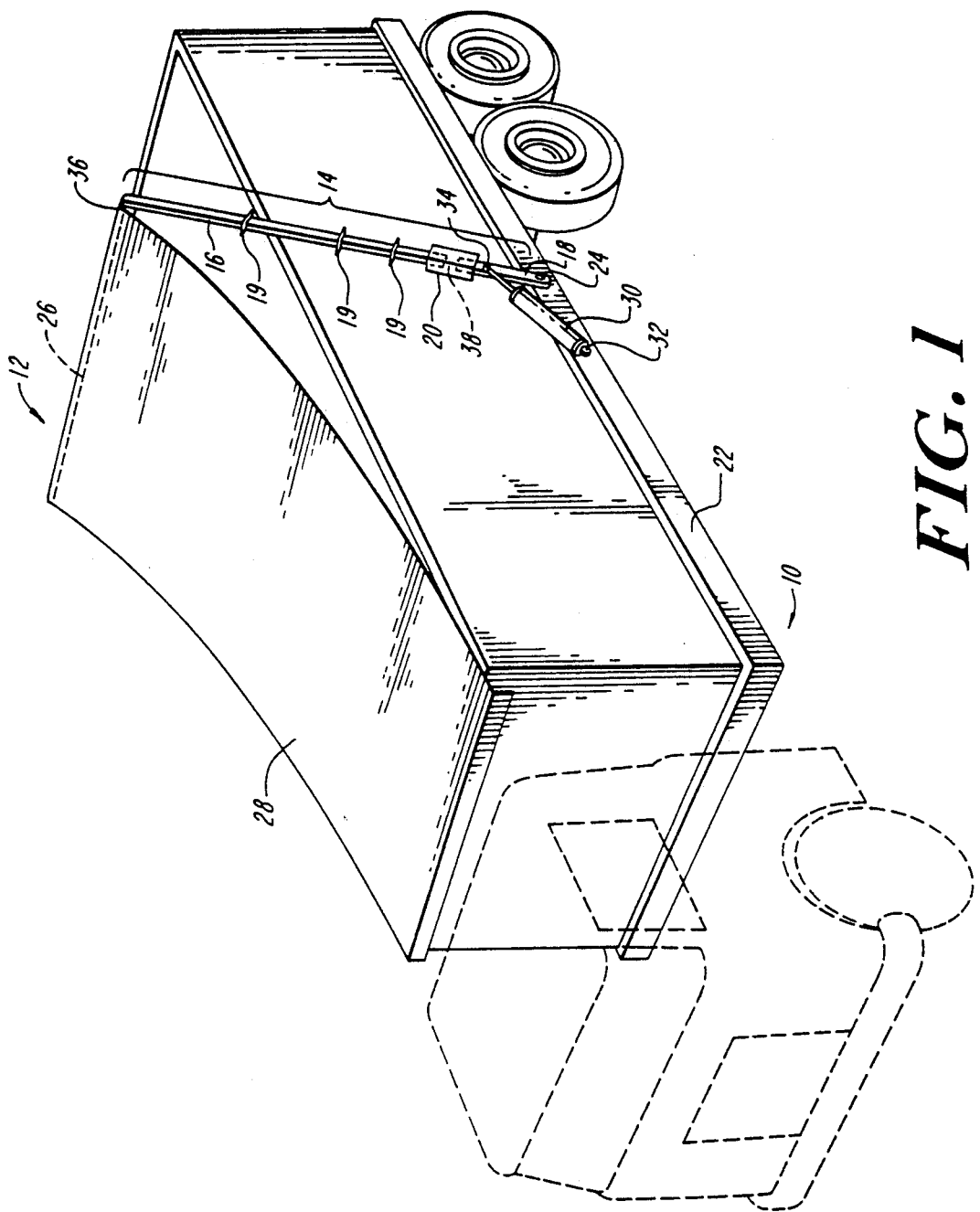
FIG. 1 is a perspective view of an insulating truck cover manipulator assembly installed on a truck body.

Referring to FIG. 1, a perspective view of a truck body 10 is shown with an insulated truck cover manipulator assembly 12 installed. In an exemplary embodiment, the insulated truck cover manipulator assembly 12 comprises two arms 14, each having an upper support member 16 connected to a lower support member 18 by an electrically insulating connector 20. Upper support member 16 and lower support member 18 are preferably made from steel, however other metals, materials, or composites may also be used. Skirts 19 are attached at various points along the upper support member 16. The lower support members 18 of each arm 14 are attached to a truck frame 22 at an articulation point 24 which pivotally secures one end of each arm 14 to the truck frame 22 A drive mechanism 30 allows the arm 14 to move longitudinally along an arcuate path about articulation point 24. The upper support members 16 are attached to each other by a tie-rod 26 that provides structural stability between the arms 14, and holds a flexible cover 28 in a desired position during operation.

As shown in FIG. 1, at least one drive unit 30 is movably mounted on the truck frame 22 at an articulation point 32, and is attached to the lower support member 18 at articulation point 34. Usually, a drive unit is located on each side of the truck body in cooperation with a respective arm. As the drive unit 30 moves the arms 14, the articulation points 32 and 34 allow the drive unit 30 to rotate. The drive unit 30 of FIG. 1 is shown as a hydraulic cylinder, but a mechanical screw, electric motor, pneumatic cylinder, or spring may also be employed. Alternatively, arms 14 may also be moved manually.

In addition to electrically isolating the upper support member 16 from the lower support member 18, the insulating connector 20 facilitates easy repair of the arm 14 in the event the upper support member 16 or tie-rod 26 are damaged during operation. While the flexible cover 28 is drawn longitudinally across the trailer, the weight of the flexible cover 28 places stress on the upper end 36 of the arms 14 and the tie-rod 26, which may cause them to bend or break. A damaged upper support member 16 may be removed from the insulating arm 14 by detaching it from the insulating connector 20 at its lower end 38. A new upper support member 16 may then be reattached to the insulating connector 20 at its new lower end 38.

Figure 2:
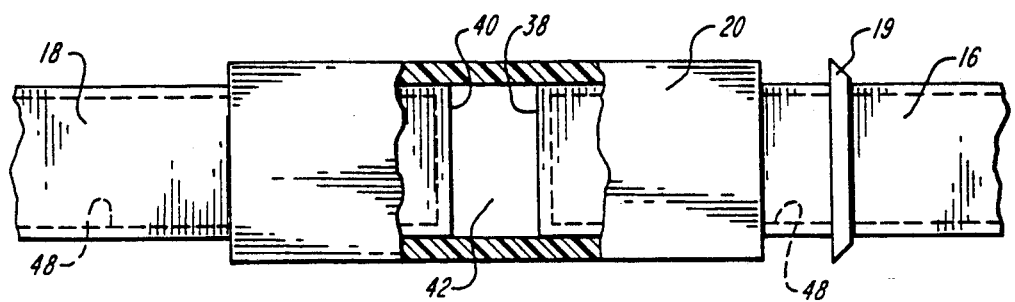
FIG. 2 is a cutaway view of an insulating connector of an arm of the insulating truck cover manipulator assembly of FIG. 1.

Referring to FIG. 2, a cutaway view of the insulating connector 20 is shown. In the illustrated embodiment, the support members 16 and 18 are of rectangular cross-section and are fabricated of steel. The connector 20 is of an electrically insulative material having sufficient mechanical strength to provide mechanical joinder of the support members 16 and 18 and to retain these members as part of the manipulator assembly during opening and closure of the flexible cover. A preferred material is reinforced thermoset polyester fiberglass, NEMA grade GPO-3. Other electrically insulating materials having requisite structural properties may also be used. The interior dimensions of the connector 20 are sized in relation to the exterior dimensions of the support members 16 and 18 to provide a close fit between the connector and the support members when the support members are inserted into the connector sleeve. The connector 20 is retained on the members 16 and 18 by any suitable fastening means such as rivets or nuts and bolts.

The confronting ends 38 and 40 of the respective support members 16 and 18 are spaced from each other by a gap 42 sufficient to prevent electricity from arcing across the confronting ends of the conductive support members in the event of engagement of the manipulator assembly with a power line. Given that the breakdown constant of dry air is 20,000 volts per inch, a minimum separation distance or gap of about 1 inch is required to provide electrical isolation for exposure to overhead power lines which can be as high as 18,000 volts traversing streets and highways over which trucks could typically travel. In order to increase the dielectric constant of the gap between the confronting support members, a dielectric material could be provided within the gap 42 to further increase the voltage breakdown across that gap in relation to the voltage breakdown across an air gap. Additionally, support members 16 and 18 may be filled with dielectric foam 48 in order to prevent moisture from condensing on the inside of the support members.

A plurality of skirts 19 are attached at spaced positions along the upper support members 16 to serve as deflectors for shedding rain or other liquid away from the support arms and connector 20, and to increase electrical path length. The skirts are made of an electrically non-conducting material, such as UV resistant dielectric rubber, and are attached to the support members 16 by suitable fasteners such as rivets, screws, or adhesive. In the illustrated embodiment, the skirts have an outwardly flaring peripheral surface to act as a water deflector.

Figure 3:
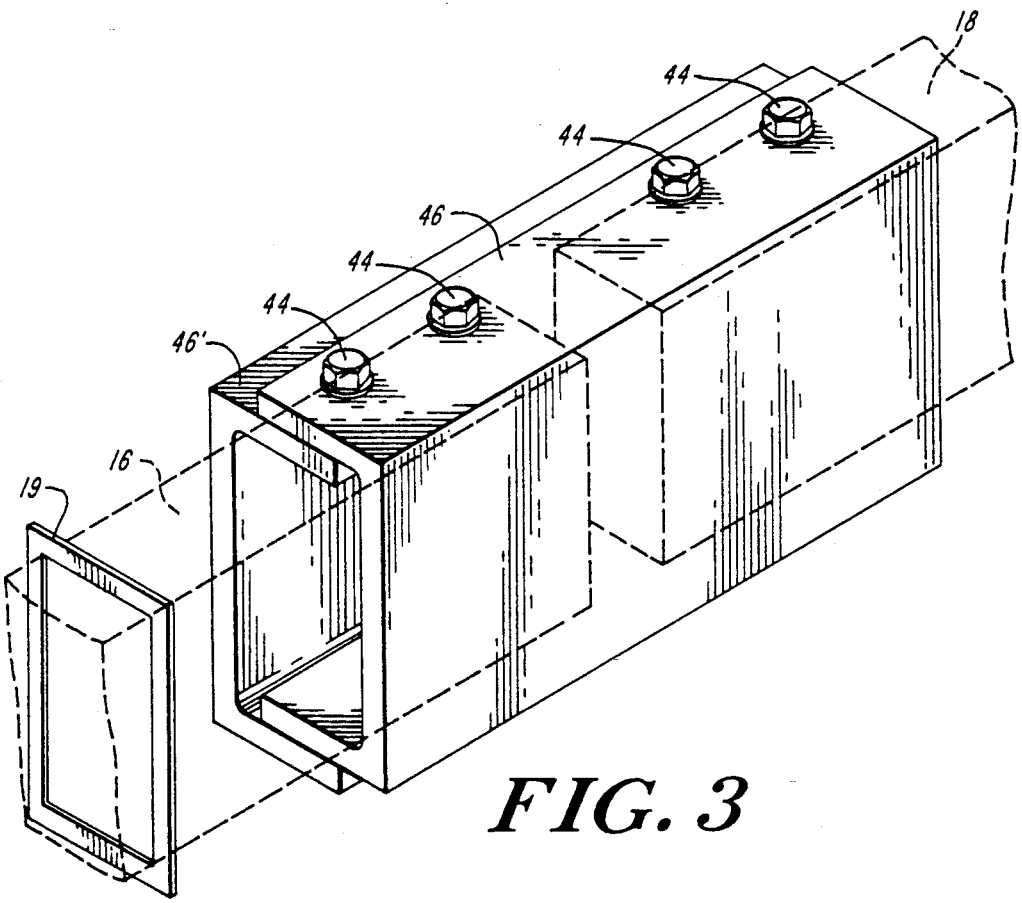
FIG. 3 is a cutaway view of the insulating connector of FIG. 2.

As shown in FIG. 3, the electrically insulating connector 20 can be fabricated by two cooperative elements secured together to engage and join the support members 16 and 18. The insulating connector 20 comprises two identical channel shaped pieces 46 and 46' each overlapping as illustrated and surrounding the confronting end portions of the support members 16 and 18. Pieces 46 and 46' are secured to each other and to the confronting support members 16 and 18 by bolts 44 which can be threaded into cooperative openings or by any other suitable fasteners.

While in the illustrated embodiment, the support member 16 and 18 and connector 20 are shown as being of rectangular cross-section, it is contemplated that these components can be made in any convenient cross-section and may, for example, be of tubular configuration. The length of the connector 20 and the length of the inserted ends of the support member 16 and 18 depends upon the strength of the materials employed and the intended strength of the interconnected assembly suit the particular operational requirements. In a typical installation, the support member 16 and 18 are inserted to a distance of about 12 inches into the connector 20.

While the invention has been described with respect to open top truck trailers and truck bodies, it will be recognized that the invention is equally useful for other types of open top receptacles and containers.

Other modifications and variations of the present invention are possible in light of the above teachings. It is, therefore, to be understood that within the scope of the appended claims, the present invention may be practiced otherwise than as in the embodiments specifically described hereinabove.

I claim:

1. An insulating truck cover manipulator assembly comprising:
    a first arm and a second arm, each of said arms comprising:
        a lower support member, having a first end and a second end, said first end pivotally attached to an upwardly open truck trailer at a first point of articulation, said second end removably attached to an insulator; and
        an upper support member, having a first end and a second end, said first end attached to a tie structure, and said second end removably attached to said insulator; and
    said tie structure, joining said first end of said upper support member of said first arm to said first end of said upper support member of said second arm, and attached to a flexible cover, wherein said insulator comprises two sections of C-shaped insulative material co-acting to form a sleeve, and each of said sections of C-shaped insulative material is fixedly attached to said second end of said lower support member and said second end of said upper support member, said insulator electrically insulating said upper support member from said lower support member and joining said upper support member to said lower support member providing structural integrity therebetween.

2. An insulating arm to support and move a flexible cover across a trailer comprising:
    a lower support member, having a first end and a second end, said second end removably attached to an insulator, said lower support member filled with dielectric foam; and
    an upper support member, having a first end and a second end, said first end attached to a tie structure, and said second end removably attached to said insulator, said upper support member filled with dielectric foam,
    wherein said insulator insulates said lower support member from said upper support member, and
    wherein said insulator comprises two sections of C-shaped insulative material co-acting to form a sleeve, and each of said sections of C-shaped insulative material is fixedly attached to said second end of said lower support member and said second end of said upper support member.

* * * * *